(12) United States Patent
Jakubaszek

(10) Patent No.: US 9,562,512 B2
(45) Date of Patent: Feb. 7, 2017

(54) DUAL ROTOR WIND OR WATER TURBINE

(75) Inventor: Marek Jakubaszek, Nottingham (GB)

(73) Assignee: AURORA LIMITED, Nottingham (GB)

( * ) Notice: Subject to any disclaimer, the term of this patent is extended or adjusted under 35 U.S.C. 154(b) by 354 days.

(21) Appl. No.: 13/551,078

(22) Filed: Jul. 17, 2012

(65) Prior Publication Data

US 2014/0021722 A1  Jan. 23, 2014

(51) Int. Cl.
| | |
|---|---|
| *F03D 9/00* | (2016.01) |
| *H02P 9/04* | (2006.01) |
| *F03D 1/02* | (2006.01) |
| *F03B 17/06* | (2006.01) |

(52) U.S. Cl.
CPC ............ *F03D 1/025* (2013.01); *F03B 17/061* (2013.01); *F03D 15/00* (2016.05); *F05B 2210/16* (2013.01); *F05B 2260/40311* (2013.01); *Y02E 10/28* (2013.01); *Y02E 10/722* (2013.01)

(58) Field of Classification Search
CPC ............... F03B 17/061; F03B 2210/16; F03B 2260/40311; F03D 11/02; F03D 1/025; F03D 1/02; F03D 3/02
USPC .................................................... 290/44, 55
See application file for complete search history.

(56) References Cited

U.S. PATENT DOCUMENTS

| | | | | |
|---|---|---|---|---|
| 4,039,848 | A | * | 8/1977 | Winderl .......................... 290/55 |
| 5,876,181 | A | * | 3/1999 | Shin .......................... F03D 1/06 415/2.1 |
| 7,679,208 | B1 | * | 3/2010 | Ko ........................ F03D 7/0224 290/44 |
| 8,264,096 | B2 | * | 9/2012 | Micu ....................... F03D 1/025 290/43 |
| 2006/0093482 | A1 | | 5/2006 | Wacinski |
| 2010/0225118 | A1 | * | 9/2010 | Micu ....................... F03D 1/025 290/55 |
| 2011/0305570 | A1 | * | 12/2011 | Shin et al. ...................... 416/33 |

FOREIGN PATENT DOCUMENTS

| | | |
|---|---|---|
| CH | 703018 A2 | 10/2011 |
| GB | 696653 A | 9/1953 |
| JP | 63029064 A | 2/1988 |
| JP | 20033129937 A | 5/2003 |
| WO | 0600349 A1 | 1/1996 |

* cited by examiner

*Primary Examiner* — Tulsidas C Patel
*Assistant Examiner* — Thomas Quigley

(57) ABSTRACT

A dual rotor arrangement 100 for a wind or water turbine has a planetary gearbox with two inputs and an output. One rotor 1 is connected to one of the inputs 3 and the other rotor 8 is connected to the other input 6. A generator is connected to the high speed shaft 11. The rotational speed of the output is determined by the relative rotational speeds of the rotors which means that the generator produces electricity of a desired frequency. The arrangement enables electricity of constant frequency to be generated under conditions where the wind or water speed is variable.

8 Claims, 4 Drawing Sheets

DUAL ROTOR WIND OR WATER TURBINE

BACKGROUND OF THE INVENTION

This invention relates to wind and water turbines, and in particular to wind and water turbines having dual rotors.

Wind or water turbines are devices for converting wind or water power into electrical power and usually include a rotor, a gear box and a generator. In operation, wind causes the rotor to rotate and to provide a high torque, relatively low frequency input to the gear box. The gearbox transforms this input to provide a high, preferably constant, speed to the generator so that alternating current of the required frequency is produced.

In dual rotor turbines, combining the rotational energy from each rotor so that a single generator may be used has been achieved using bevel gears. It has also been achieved by connecting each turbine rotor to counter-rotating stator and rotor components of a generator, or having the first turbine rotor connected to first generator field rotor, and second turbine rotor connected to second field rotor. This arrangement means that the two rotors rotate in opposite directions and, for the first approach, the speed of the two rotors relative to each other cannot be adjusted.

One problem with existing wind/water turbine assemblies is the difficulty of maintaining a constant output speed to the generator. Another drawback is the relatively complex nature of wind/water turbine gearboxes, often utilizing multiple stage planetary gear systems.

US 2006/0093482 A1 discloses a windmill having counter-rotating screws. The screws are both located on the upwind side of an epicyclic gearbox, and serve to increase power supplied at a turbine location. The speed of the rotors can be controlled using a breaking mechanism, but the windmill is not configured to produce a constant output speed.

BRIEF SUMMARY OF THE INVENTION a dual rotor arrangement for a wind or water turbine comprising: a planetary gearbox having a first input, a second input and an output; a first rotor connected to the first input; a second rotor connected to the second input; and a generator connected to the output. A rotational speed of the output is determined by a relative rotational speed of the first and second rotors so that the generator produces electricity of a desired frequency. The arrangement enables electricity of constant frequency to be generated under conditions where the wind or water speed is variable.

The dual rotor arrangement may further comprise blades having a variable pitch attached to the first rotor so that, in use, a rotational speed of the first rotor may be varied. This allows the relative speed of the first rotor with respect to the second rotor to be varied according to the wind or water speed.

The dual rotor arrangement may further comprise blades having a variable pitch attached to the second rotor so that, in use, a rotational speed of the second rotor may be varied. This allows the relative speed of the second rotor with respect to the first rotor to be varied according to the wind or water speed.

The dual rotor arrangement may be further configured so that the first rotor is upstream of the second rotor.

The dual rotor arrangement may be further configured so that the upstream first rotor has a smaller diameter than the downstream second rotor. This arrangement means that the second rotor is at least partly positioned away from turbulence caused by operation of the first rotor.

The dual rotor arrangement may be further configured so that the first rotor and the second rotor rotate in a same direction.

The dual rotor arrangement may be further configured so that the first rotor and the second rotor rotate in a different direction.

The dual rotor arrangement may be further configured so that the first input is connected to a ring gear of the planetary gearbox.

The dual rotor arrangement may be further configured so that the second input is connected to a planet carrier of the planetary gearbox.

The dual rotor arrangement may be further configured so that the output is connected to a sun gear of the planetary gearbox.

BRIEF DESCRIPTION OF THE SEVERAL VIEWS OF THE DRAWING

For a more complete explanation of the present invention and the technical advantages thereof, reference is now made to the following description and the accompanying drawing in which.

DETAILED DESCRIPTION OF THE INVENTION

Figure 1:
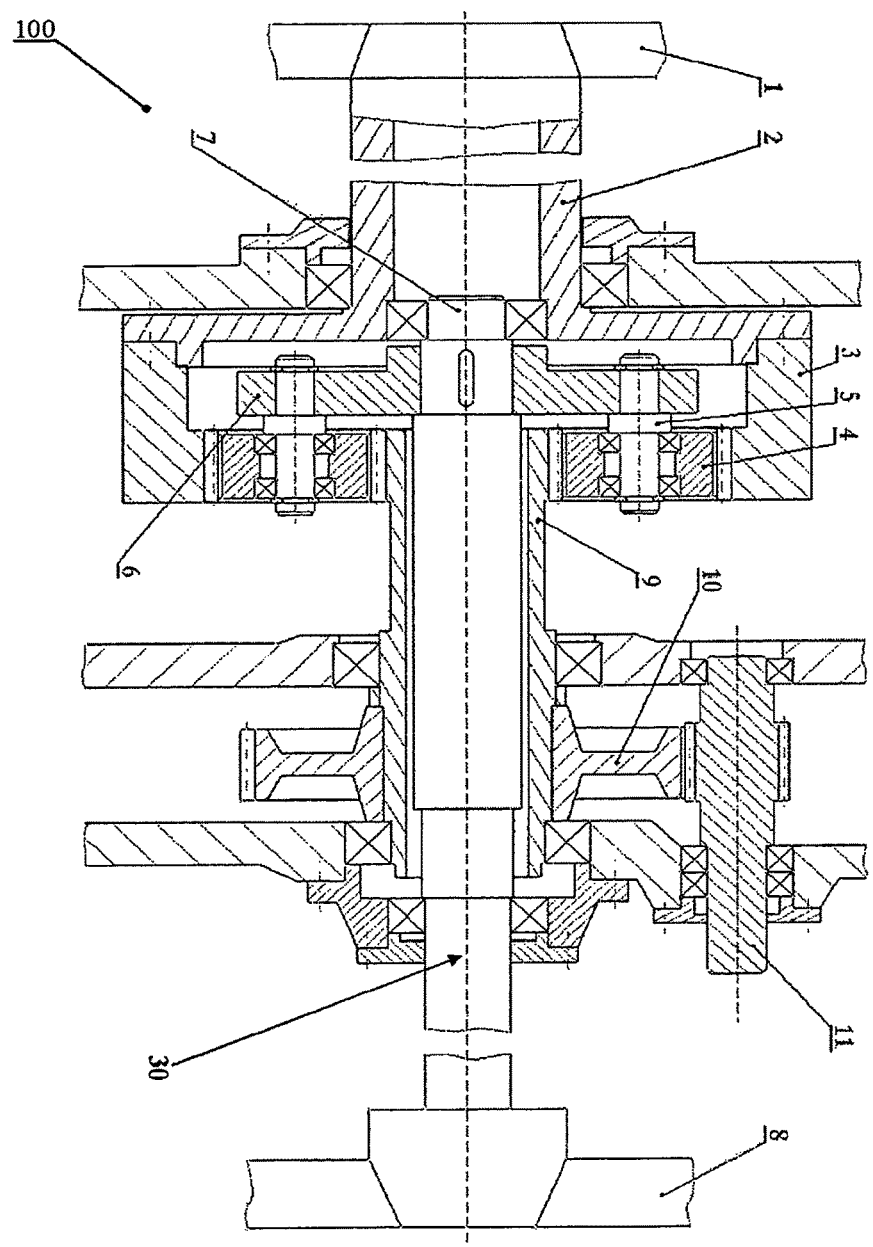
FIG. 1 is a sectional view of a gearbox layout of the present invention.
Figure 3:
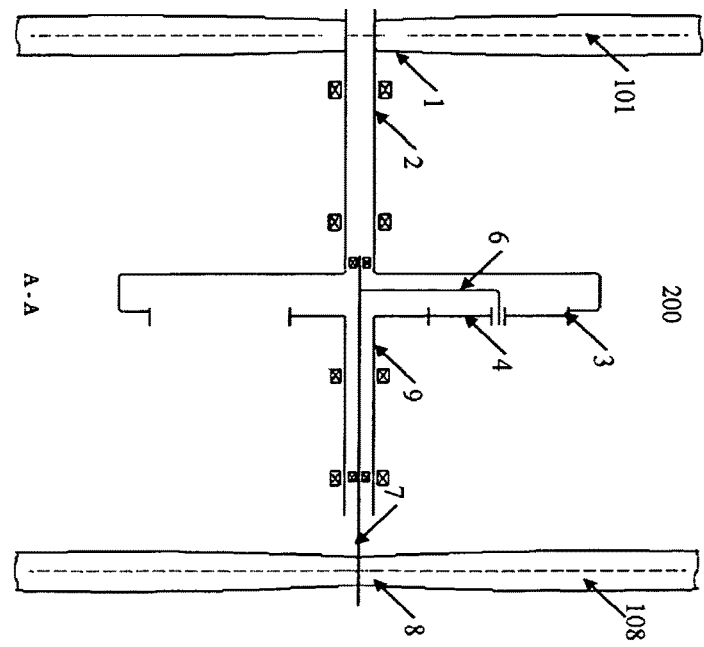
FIG. 3 is a schematic view of a gearbox layout of the present invention.

FIGS. 1 and 3 show a dual rotor wind or water turbine 100 that enables electricity of near constant frequency to be generated when operated under conditions where the wind or water velocity is variable. The arrangement includes planetary gearbox 200 having first input 3, second input 6 and output 9. Output 9 is coaxial to an axis 30 around which the dual rotors rotate. First rotor 1 is connected to first input 3, second rotor 8 is connected to second input 6; and a generator (not shown) is connected to output 9. A rotational speed of output 9 is determined by a relative rotational speed of first rotor 1 and second rotor 8 so that the generator produces electricity of a desired frequency. In the exemplary embodiment shown in FIGS. 1 and 3, first input 3 is a ring gear, second input 6 is a planet carrier, and output 9 is a sun gear. Thus turbine 100 has blades 101 on first rotor 1 connected to sleeve 2 which is connected in turn to a ring gear 3. Ring gear 3 is meshed with planet gear 4. Planet gear 4 is supported by bearings on pin 5. Pin 5 is fixed on planetary carrier 6 embedded on shaft 7.

Shaft 7 is connected to second rotor 8 having blades 108. Planet gear 4 is also meshed with sun gear on shaft 9 which is in turn connected to high speed intermediate shaft 10 and engaged with high speed output shaft 11. Output shaft 11 is connected to a generator (not shown).

There are two sources of torque in this gearbox, rotors 1 and 8.

First, torque generated from rotor 1 is transferred to planet gears 4 via sleeve 2 and ring gear 3.

Secondly, torque from rotor 8 is transferred to planet gears 4 through shaft 7, planetary carrier 6 and pin 5.

Torque is combined at mesh between ring gear 3 and planet gears 4 and transferred to the output via sun gear on shaft 9. High speed intermediate shaft 10 is connected to sun gear on shaft 9, and the combined torque is transfer high speed output shaft 11 as output torque to the generator.

Figure 2:
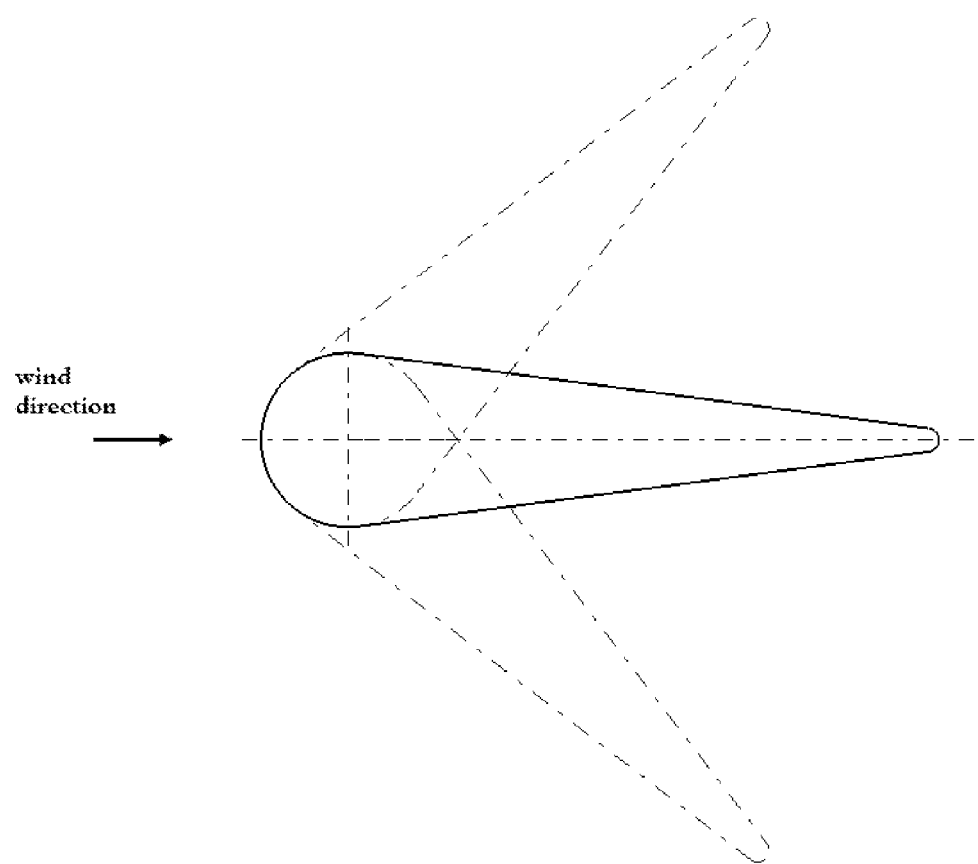
FIG. 2 is a plan view of the configuration of the rotor blades.

FIG. 2 shows angular positions of blades 101 and/or 1088 on the two rotors and the angular position can be adjusted to alter the relative speeds of the two rotors. The variable angle blades can form part of one or both rotors. Output shaft 11 speed depends on the angular position of the blades 1 and/or 8 which can be multiplication or reduction.

In operation, a sensor measures rotational speed of high speed shaft 11 and information is send to a control box. If speed is for example higher than designed one, a signal from controller box is sent to a pitch control device, for example through a slip ring or radio control, to adjust the angular position of blades 101,108 to alter the relative speeds of the rotors 1,8. A pitch angle for upwind rotor blades 101 can assume values from 0 up to 180 degrees. For 180 degrees upwind rotor will rotate in opposite direction. Thus, upwind rotor 1 can rotate in either direction relative to downwind rotor 8. The relative direction of rotation is dependent on the pitch of upwind blades 101, which may be varied to cause upwind rotor 1 to rotate in the opposite direction to downwind rotor 8. A rotational speed of output 9, and hence output shaft 11, is determined by a relative rotational speed of first rotor 1 and second rotor 8 so that the generator produces electricity of a desired frequency. The arrangement enables electricity of constant frequency to be generated under conditions where the wind or water speed is variable.

Figure 4:
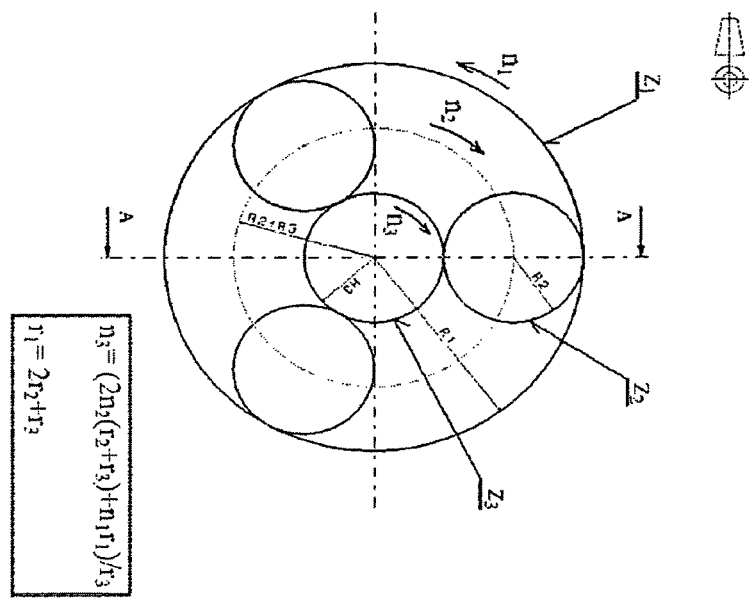
FIG. 4 is a sectional view of a gearbox of the present invention at A-A.

FIG. 3 shows a schematic of one configuration of a dual rotor wind or water turbine system, and FIG. 4 shows a cross-sectional view of a gearbox having three planetary gears. The output speed of the output shaft 10, n3, is given by the following relationship:

$$(2n2(r2+r3)+n1r1)/r3$$

Where n1 is the rotational speed of rotor 1, n2 is the rotational speed of rotor 8, r2 is the radius of the planetary gears 4, r3 is the radius of the sun shaft 9, and r1=2r2+r3.

Note that in this example the rotors are counter-rotating.

The present invention provides a simple construction involving a single stage planetary system. It is an approach for controlling the output speed using a control system to alter the pitch of the rotor blades of the one or both turbines.

Figure 5:
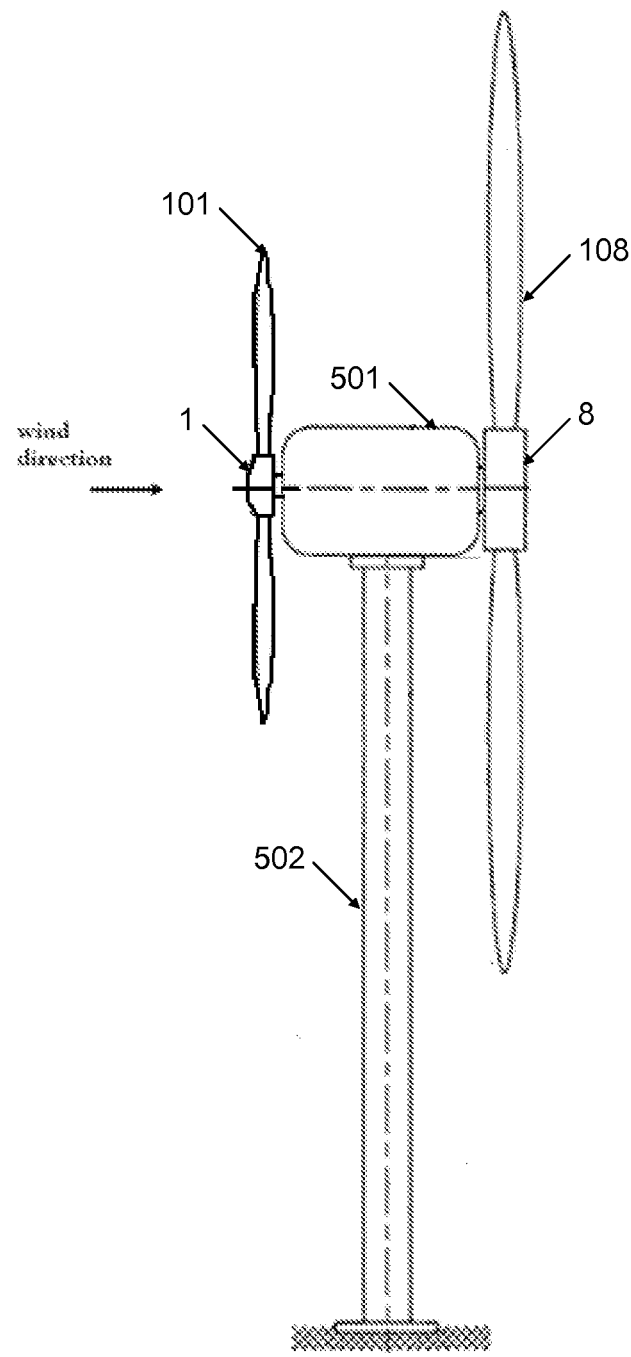
FIG. 5 is a side view of a wind turbine installation of the present invention.

FIG. 5 shows a wind turbine installation of the present invention, in which turbine arrangement 100 is housed in nacelle 501 supported on tower 502. Upwind rotor 1 and blades 101 fixed thereto, and downwind rotor 8 and blades 108 fixed thereto are shown.

Although the foregoing described a dual rotor system 100 in which upwind rotor 1 is positioned at an upwind end of gearbox 200 in nacelle 501 and downwind rotor 8 is positioned at a downwind end of gearbox 200 in nacelle 501, upwind rotor 1 and downwind rotor 8 may be located at an upwind end of gearbox 200 in nacelle 501. According to this configuration, shaft 7 is extended in the upwind direction and rotor 8 is attached thereto on an upwind side of turbine arrangement 100.

The invention claimed is:

1. A dual rotor arrangement for a wind or water turbine comprising:
    a planetary gearbox having a first input connected to a first rotor, a second input connected to a second rotor, and an output connected to a generator, and in which said first rotor and second rotor comprise blades having a variable pitch;
    wherein said output is coaxial with an axis around which the first and second rotors rotate, said first input is connected to a ring gear of said planetary gearbox, said second input is connected to a planet carrier of said planetary gearbox, said output is connected to a sun gear of said planetary gearbox, said first rotor is upstream of said planetary gearbox and said second rotor is downstream of said planetary gearbox;
    wherein, in use, a rotational speed of said output is determined by a relative rotational speed of said first and second rotors and controlled by an angular position of said blades so that said generator produces electricity of a desired frequency under conditions where a speed of said wind or water is variable.

2. The dual rotor arrangement of claim 1, in which in which said first rotor is positioned on an upwind side of said second rotor and said first rotor has a smaller diameter than said second rotor, wherein in use said second rotor is at least partly positioned away from turbulence caused by operation of said first rotor.

3. The dual rotor arrangement of claim 1, in which in which said first rotor is positioned on an upwind side of said second rotor and said first rotor has a smaller diameter than said second rotor, wherein in use said second rotor is at least partly positioned away from turbulence caused by operation of said first rotor.

4. The dual rotor arrangement of claim 1, an angular position of said blades may be varied to cause said first rotor and said second rotor rotate in a same direction or in a different direction.

5. The dual rotor arrangement of claim 1, in which said output is connected to a generator via a high speed intermediate shaft and a high speed output shaft.

6. A wind or water turbine comprising said dual rotor arrangement of claim 1.

7. The dual rotor arrangement of claim 1, in which said rotational speed of said output is measured and said angular position of said blades is altered to change the relative speeds of said first rotor and said second rotor rotors.

8. The dual rotor arrangement of claim 1, in which said rotational speed of said output shaft is given by the relationship (2n2(r2+r3)+n1r1)/r3, in which n1 is a rotational speed of said first rotor, n2 is the rotational speed of said second rotor, r2 is the radius of planetary gears, r3 is the radius of said sun shaft, and r1=2r2+r3.

\* \* \* \* \*

UNITED STATES PATENT AND TRADEMARK OFFICE
CERTIFICATE OF CORRECTION

| | | |
|---|---|---|
| PATENT NO. | : 9,562,512 B2 | |
| APPLICATION NO. | : 13/551078 | |
| DATED | : February 7, 2017 | |
| INVENTOR(S) | : Marek Jakubaszek | |

It is certified that error appears in the above-identified patent and that said Letters Patent is hereby corrected as shown below:

On the Title Page

Item (73) the assignee is wrongly given as AURORA LIMITED, Nottingham (GB).
The assignee is ROMAX TECHNOLOGY LIMITED, Nottingham (GB).

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*